(12) United States Patent
Jokinen et al.

(10) Patent No.: US 9,330,054 B2
(45) Date of Patent: May 3, 2016

(54) SYSTEM AND METHOD FOR ASSIGNING A MESSAGE (71) Applicant: FREESCALE SEMICONDUCTOR, INC., Austin, TX (US)

(72) Inventors: Tommi N. Jokinen, Austin, TX (US); David B. Kramer, Cedar Park, TX (US); Kun Xu, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 733 days.

(21) Appl. No.: 13/664,565

(22) Filed: Oct. 31, 2012

(65) Prior Publication Data
US 2014/0122735 A1    May 1, 2014

(51) Int. Cl.
G06F 15/16 (2006.01)
G06F 15/173 (2006.01)
H04L 12/863 (2013.01)
H04L 12/851 (2013.01)

(52) U.S. Cl.
CPC ...... G06F 15/17312 (2013.01); H04L 47/2441 (2013.01); H04L 47/621 (2013.01)

(58) Field of Classification Search
USPC .......................... 709/231, 234, 235, 236, 238
See application file for complete search history.

(56) References Cited

U.S. PATENT DOCUMENTS

| | | | |
|---|---|---|---|
| 6,839,794 B1 | 1/2005 | Schober | |
| 6,980,555 B2 * | 12/2005 | Mar | 370/395.21 |
| 7,596,141 B2 | 9/2009 | Basu et al. | |
| 7,751,422 B2 | 7/2010 | Narayanan | |
| 7,948,977 B2 | 5/2011 | Bennett | |
| 2006/0126628 A1 | 6/2006 | Li et al. | |
| 2008/0037539 A1 * | 2/2008 | Paramaguru | 370/392 |

OTHER PUBLICATIONS

Freescale Semiconductor, Inc., "QorIQ Data Path Acceleration Architecture (DPAA) Reference Manual," Chapter 10: RapidIO Message Manager (RMan); Rev. 2, Nov. 2011, Document No. DPAARM; pp. 10-1 to 10-138; downloaded from <<http://www.freescale.com/webapp/sps/site/prod_summary.jsp?code=P4080&fpsp=1&tab=Documentation_Tab>> on Oct. 31, 2012, 140 pages.

* cited by examiner

Primary Examiner — Lan-Dai T Truong (57) ABSTRACT

A processor of a plurality of processors includes a processor core and a message manager. The message manager is in communication with the processor core. The message manager to receive a message from a second processor of the plurality of processors, to identify a classification rule for the message based on bits in a header of the message, and to create a queue identifier for the message using bits of a payload of the message, wherein the queue identifier is associated with a queue of the processor core.

20 Claims, 4 Drawing Sheets

SYSTEM AND METHOD FOR ASSIGNING A MESSAGE

FIELD OF THE DISCLOSURE

This disclosure generally relates to data processing, and more particularly to a system and method for assigning messages within a data processing system.

BACKGROUND

A system includes a switching fabric to communicate information between multiple data processor devices that can communicate with each other via multiple data streams (streams). The switching fabric can route data for a particular stream from a source device to a destination device using a packetized message (a packet) having a header that includes header fields, and a payload that includes data. Such header fields can include a source identifier field, a destination identifier field, a class-of-service identifier field, a stream identifier field, a flow identifier field, and the like. At the destination device, a message manager can determining a queue where a received packet is to be routed based on the header fields of the message. The message manager can then send the packet and an identifier indicating the target queue to a queue manager, which in turn can store the received packet in the queue indicated by the queue identifier.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following description in combination with the Figures is provided to assist in understanding the disclosure herein. The following discussion will focus on specific implementations and embodiments of one or more embodiments. This focus is provided to assist in describing the embodiments and should not be interpreted as a limitation on the scope or applicability of the disclosure, as other embodiments can be utilized.

FIGS. 1-5 illustrate embodiments of a messaging system employing multiple processors that can utilize different data streams to communicate information amongst each other via a switching fabric. During initialization, restart, or any type of configuration process, a processor that can receive a data stream from a source processor, referred to as a destination processor, can be initialized with a set of classification rules. In another embodiment, the set of classification rules can be determined and configured during a design process of the processor. According to an embodiment, when a packet of a packetized message is received by the destination device during normal operation, the message manager selects one of the classification rules, which were provided during start-up, based upon particular bits of the received packet. The particular bits used to select the classification rule can be from one or more header fields of the packet. In determining the selected classification rule, the message manager can use multiple classification rule wildcard registers, each of which can indicate a portion of the one or more header fields of the message that is to be masked when selecting the classification rule. Thus, the message manager can determine the base queue identifier for a packet based only upon header bits of the data packet.

Once the base queue identifier is determined, the message manager then determines a specific queue relative to the base queue where a message is to be routed. For example, a queue offset relative to a base queue identifier can be determined. Thus, the queue offset can be based on various bits selected from the header fields and the payload of the packetized message. According to an embodiment, the specific queue is determined by combining the queue offset with the base queue identifier to create a destination queue identifier for the message. The message manager then sends the message and the queue identifier to a queue manager of the destination processor, which in turn routes the received message to a particular queue identified by the queue identifier. Various embodiments of the present disclosure will be better understood with reference to FIGS. 1-5.

Figure 1:
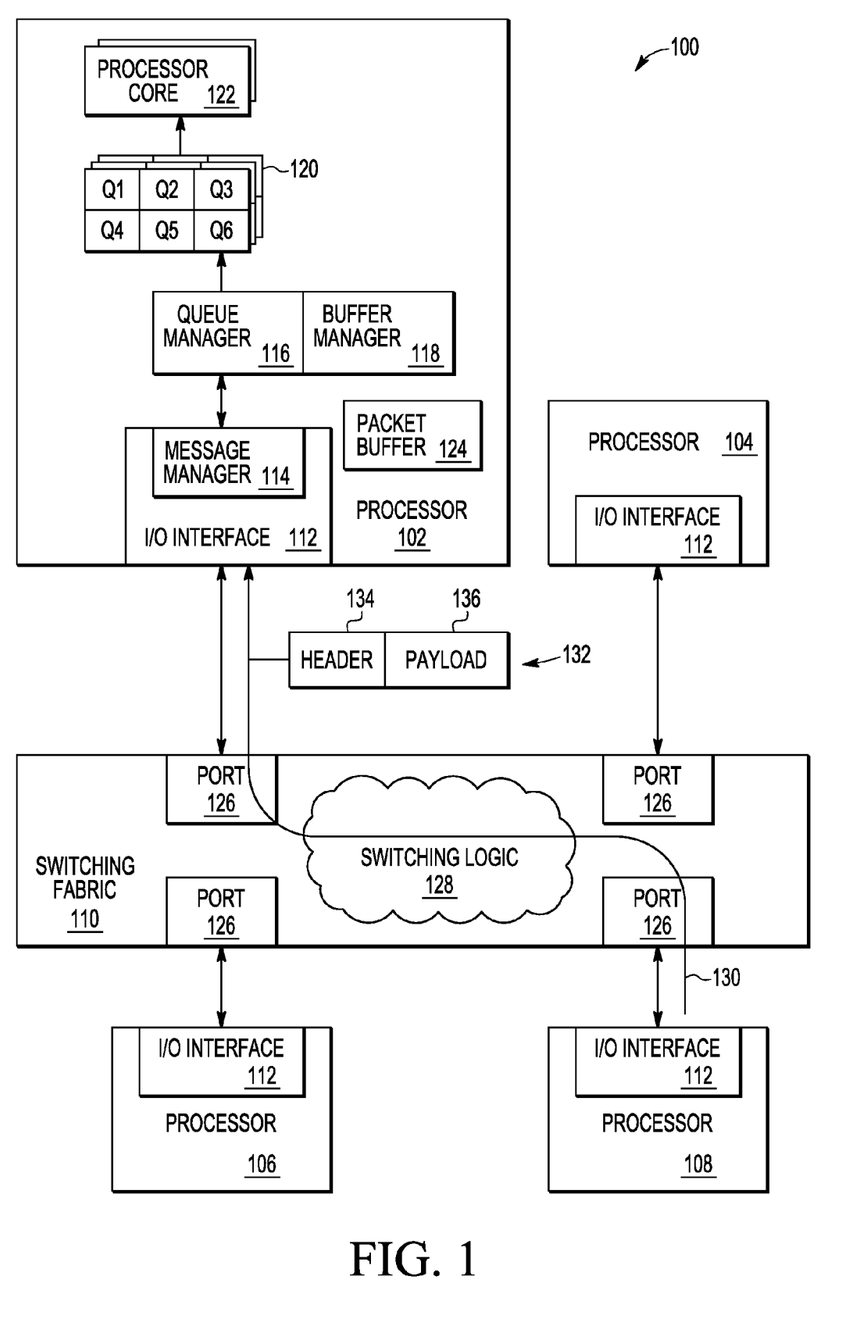
FIG. 1 illustrates a system including multiple processors in accordance with at least one embodiment of the present disclosure.

FIG. 1 illustrates a system 100 including processors 102, 104, 106, and 108 (processors 102-108) and switching fabric 110 in accordance with at least one embodiment of the present disclosure. Each of the processors 102-108 includes an input/output (I/O) interface 112. The processor 102 is described herein as receiving a data stream and is therefore also referred to as destination processor 102, though it will be appreciated that in various embodiments, processor 102 can also be a source processor that provides a data stream to another processor.

Destination processor 102 includes a message manager 114 within the I/O interface 112, a queue manager 116, a buffer manager 118, multiple groups of queues 120, multiple processor cores 122, and packet buffers 124. Depending on the embodiment, queues in the groups of queues 120 can be physical queues, virtual queues, and the like. Each of the other processors 104, 106, and 108 can also include a message manager, a queue manager, a buffer manager, queues, multiple processor cores, and a packet buffer, but these have not been shown in FIG. 1 for simplicity.

The switching fabric 110 includes multiple ports 126 and switching logic 128. Each of the processors 102-108 is connected to a corresponding port 126, and can operate as a destination processor or a source processor for receiving and sending messages, respectively. However, for simplicity it is presumed that processor 102 is operating as a destination processor and processor 108 is operating as a source processor.

A particular data stream 130 is illustrated to communicate packetized messages between source processor 108 and destination processor 102 via a particular communication path through the switching fabric 110. The message 132 is a packet that includes a header 134 and a payload 136. The header 134 can include multiple fields, such as an extended destination identification (EDID) field, a destination identification (DID) field, an extended source identification (ESID) field, a source identification (SID) field, a class-of-service (COS) field, a stream identification field, a flow identification field, a physical source port (PORT) field, a letter field, a mailbox field, and the like. Based upon the header information, the switching logic 128 determines that the message 132 is addressed to the destination processor 102, and routes the message 132 out of the switching fabric 110 via the port 126 to the destination processor 102.

In an embodiment, the communication path can include: an intra-die communication path, wherein packets are transmitted between processors of a common integrated circuit die; or an inter-die communication path, wherein packets are transmitted between processors on different die. For example, the processor 102 and processor 108 can reside on separate die that are mounted to a common substrate, such as to a printed circuit board, to a package substrate, and the like. According to one embodiment the packetized messages are compliant with the RapidIO communication protocol. Thus, the system 100 can utilize the RapidIO communication protocol to transfer messages 132 between different processors of the system 100, such as instruction based data processors. In one embodiment, the messages 132 can be a RapidIO doorbell messages and the like. In one embodiment, the message 132 can be transferred between the processors by the switching logic 128, which can be a cross-point switch implemented in hardware, software, or the like.

When the I/O interface 112 of the destination processor 102 receives the message 132, the message manager 114 utilizes the header 134 information of the message 132 to determine a classification rule for the message 132 that is used to further determine a particular group of the groups of queues 120 at which the message will be stored. In an embodiment, the message manager 114 can access multiple classification rule wildcard registers (shown in FIG. 3) to identify bits of the header 134 to be masked (not used) during the selection of a classification rule. The buffer manager 118 further allocates packet buffers 124, e.g., queues, in a memory cache of the destination processor 102 for the message 132 to be placed until it is retrieved by the queue manager for storage a specific queue. Depending on the embodiment, either the entire message 132 including the header 134 and the payload 136, or only the payload 136 is placed into the packet buffers 124, and subsequently into a queue of the plurality of queues 120.

Figure 2:
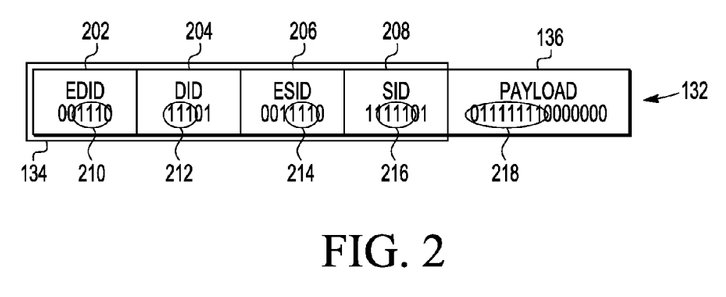
FIG. 2 illustrates a message sent between two processors in the system of FIG. 1 in accordance with at least one embodiment of the present disclosure.

FIG. 2 illustrates a message 132 sent between the source processor 108 and the destination processor 102 in accordance with at least one embodiment of the present disclosure. The header 134 of the packet includes an EDID field 202, a DID field 204, an ESID field 206, and a SID field 208. The payload 136 of the packet includes a plurality of bits including first set of bits 218. The message manager 114 can utilize bits from the header fields and from the payload 136 when determining a specific queue of the selected group of queues where the message 132 is to be stored. In particular, the message manager 114 can determine the specific queue by retrieving particular bits 210 from the EDID field, particular bits 212 from the DID field 204, particular bits 214 from the ESID field 206, particular bits 216 from the SID field 208, and particular bits 218 from the payload 136. The message manager 114 can use these particular bits to generate a queue identifier for the message 132. The operation of selecting the particular bits and generating the queue identifier for the message 132 is described in more detail with reference to FIGS. 3 and 4 below.

Referring back to FIG. 1, after the message manager 114 generates the queue identifier, the message manager 114 sends the queue identifier for the message 132 to the queue manager 116, which in turn assigns the message 132 from the packet buffer 124 to a queue of the previously identified group of the group of queues 120 based on the queue identifier. The processor core associated with that particular queue 120 can retrieve the message 132 from the queue in a group of queues 120 to perform one or more operation associated with the message 132.

The queue identifier for the message 132 that identifies the specific queue where a message is to be stored can vary based on the particular logic states of the bits in the fields of the header 134 of the message 132 and based on the particular logic states of the bits in the payload 136 of the message 132. The available header bits of message 132 that are used to determine a queue identifier can be limited such that there may be more queues available in the destination processor 102 than can be identified by using the available header bits specified in the packet header. Thus, the message manager 114 can generate more queue identifiers by also using the particular bits 218 of the payload 136. The particular bits 218 of the payload 136 may include a byte of data, such as a first or second received byte of information. Thus, the number of queues in a selected group of the groups of queues 120 that a message 132 can be assigned increases substantially by the message manager 114 incorporating a byte of the payload 136 into the queue identifier.

The processor 102, 104, 106, or 108 transmitting the message 132 can, therefore, have more control and flexibility to vary bits in the payload 136 of the message 132 as compared to varying bits in the fields of the header 134 of the message 132. As a result, the processor sending the message 132 can actively identify a particular queue in a group of queues 120 by varying the bits of the payload 136 in the message 132. The manner in which a particular queue is determined by a destination processor based upon the payload information can be understood a priori by a source processor, or the destination processor 102, e.g. the message manager 114, can transmit information to the source processor indicating the manner in which payload information is used to select a particular queue. For example, a destination processor can forward information to a source processor indicating the particular bits of the payload 136 used in classifying the message 132 and thereby assigning the message 132 to a particular queue in a group of queues 120. The source processors can use this information to set the particular bits 218 in the payload 136 of the message 132 to select a particular queue in a group of queues 120. It will be appreciated that in an alternate embodiment, that a source processor can send information to the destination processor indicating the manner in which payload information is used to select a particular queue.

Figure 3:
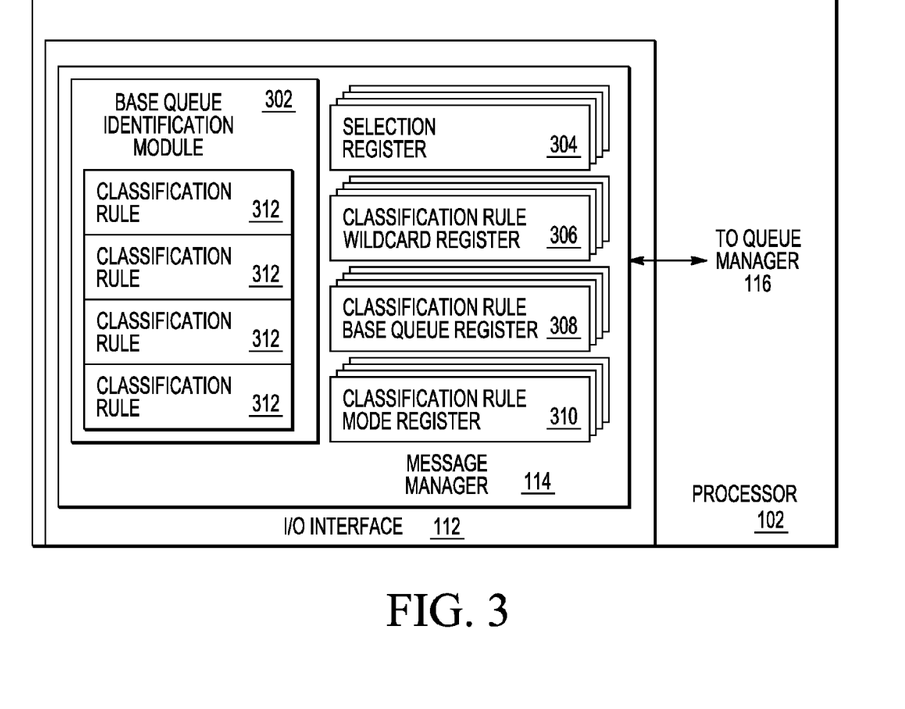
FIG. 3 illustrates an input/output controller of a processor of FIG. 1 in accordance with at least one embodiment of the present disclosure.

FIG. 3 illustrates I/O interface of FIG. 1 in greater detail and in accordance with an embodiment of the present disclosure, and in particular, FIG. 3 illustrates an embodiment of the message manager 114 in greater detail. The message manager 114 includes a base queue identification module 302, multiple selection registers 304, multiple classification rule wildcard registers 306, multiple classification rule base queue registers 308, and multiple classification rule mode registers 310. In an embodiment, the message manager 114 can include the same number of selection registers 304, classification rule wildcard registers 306, classification rule base queue registers 308, and classification rule mode registers 310 as the number of classification rules 312 in the base queue identification module 302. In this embodiment, a different one of each of the selection registers 304, the classification rule wildcard registers 306, the classification rule base queue registers 308, and the classification rule mode registers 310 corresponds to a particular classification rule 312, such as on a one-to-one basis. For example, one classification rule 312 is associated with a particular selection register 304, a particular classification rule wildcard register 306, a particular classification rule base queue register 308, and a particular classification rule mode register 310. In another embodiment, the number of different registers may vary from the number of classification rules 312. For example, the message manager 114 may include one selection register 304 for each type of message 132 that may be sent to the destination processor 102.

The base queue identification module 302 is initiated to include multiple classification rules 312, wherein each classification rule 312 can be used to select a base queue group from the group of queues 120, out of all of available the groups, for the incoming message 132. In an embodiment, the classification rules 312 can be information at storage locations, such as registers, accessible by the message manager 114, and different bits of the stored the classification rules 312 can be set to make an selection/identification of different classification rules 312 possible for the message manager 114. The different bits of the classification rules 312 registers can be set during a start-up or initialization of the processor 102. For example, each of the classification rules 312 can specify different bits and combinations of bits that are used for selecting the queue group (the base queue) from the groups of queues 120. In another embodiment, the classification rules 312 can be defined in software or an algorithm that is executed to determine a classification rule for an incoming message. The each selection register 304 identifies a number of bits to use in each of the fields of the header 134 and the payload 136 of the message 132 to identify a specific queue in the base queue for the message 132 when the message 132 is received in the I/O interface 112.

Each classification rule wildcard register 306 identifies a number of consecutive bits in each of the fields of the header 134 to be masked during the selection of a queue for the message 132. Masked bits used herein are bits that are disregarded and not used during the identification of a queue for the message 132. Each classification rule base queue register 308 can store a base queue identifier associated with the message 132 based on the classification rule 312 identified for the message 132 in the base queue identification module 302. Each classification rule mode register 310 identifies which bits of the payload 136 of the message 132 are used for identifying a particular queue in the group of queues 120 for the message 132. The message manager 114 can utilize the base queue identification module 302, the classification rule selection registers 304, the classification rule wildcard registers 306, the classification rule base queue registers 308, and the classification rule mode registers 310 to generate a queue identifier associated with the message 132 that can be used to identify a queue for the message 132 as described below with respect to FIG. 4.

Figure 4:
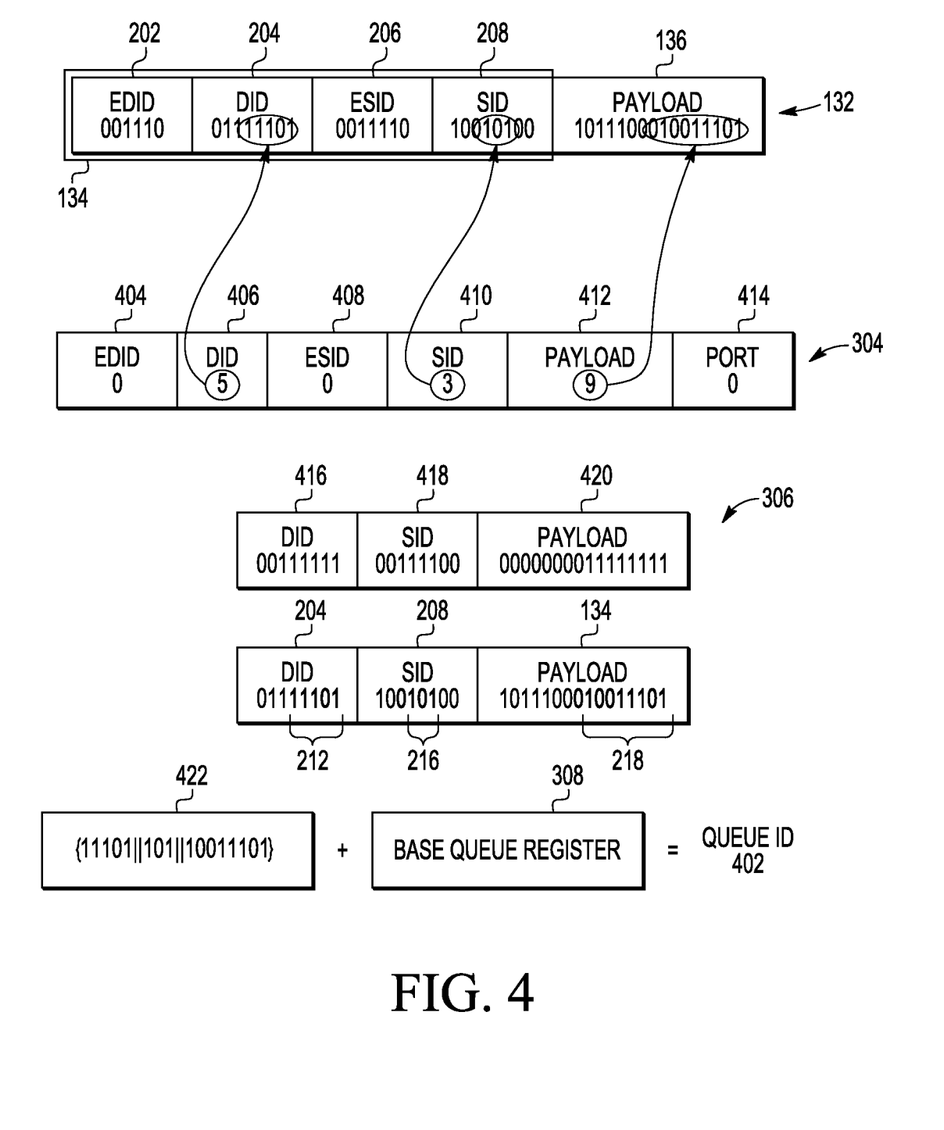
FIG. 4 illustrates a queue identifier for a queue in the processor of FIG. 1 in accordance with at least one embodiment of the present disclosure.

FIG. 4 illustrates the message 132, the selection register 304, the classification rule wildcard register 306, and the classification rule base queue register 308 used to generate a queue identifier 402 by the message manager 114 of FIG. 1 in accordance with at least one embodiment of the present disclosure. The selection register 304 includes an EDID field 404, a DID field 406, an ESID field 408, an SID field 410, a payload field 412, and a port field 414. The classification rule wildcard register 306 includes a DID field 416, an SID field 418, and a payload field 420.

When the I/O interface 112 receives the message 132, the base queue identification module 302 selects a classification rule based upon the bits of the header fields 202, 204, 206, and 208 and the classification rule wildcard registers. The message manager 114 can utilize each of the classification rule wildcard registers 306 to mask particular bits in the header 134 of the message 132. For example, if the message manager 114 includes thirty-two classification rule wildcard registers 306, e.g., thirty-two classification rules, the message manager 114 can mask the bits of the header 134 using any one of thirty-two different ways to get one of thirty-two different combinations of unmasked bits from the header 134. The message manager 114 can then compare the resulting combination of unmasked bits to select a corresponding classification rule 312, e.g., by determining which combination of unmasked bits from the header 134 matches, or most closely matches, the corresponding classification rule 312. The corresponding classification rule 312 can then be used to determine a corresponding selection register 304, a particular classification rule wildcard register 306, a particular classification rule base queue register 308, and a particular classification rule mode register 310 for the message 132. The message manager 114 can select the classification rule 312 that matches with the resulting unmasked header bits from the corresponding classification rule wildcard register 306 as the classification rule 312 for the message 132.

For example, the message manager 114 selects a particular classification rule 312 when to a classification rule wildcard register 306 generates a combination of unmasked bits from the header 134 of '01101' and the particular classification rule 312 corresponding to the classification rule wildcard register 306 identifies '01101' as the bits for that classification rule 312. In an embodiment, if message manager 114 does not identify a match between any of the classification rule wildcard registers 306 and the corresponding classification rules 312, the message manager 114 can apply different factors to determine a closest match between unmasked bits from the classification rule wildcard register 306 and the corresponding classification rule 312. In this situation, the classification rule 312 with the closest match will be selected as the classification rule 312 for the message 312.

The base queue identification module 302 can then identify a classification rule base queue register 308 corresponding to the selected classification rule 312 to select a base queue identifier for the message 132. The base queue identifier can be a value that identifies a base group of queues 120 for the message 132. The message manager 114 accesses the selection register 304 corresponding to the selected classification rule 312, or to the message type, and identifies the number of bits for each of the fields of the message 132 to be retrieved. For example, the message manager 114 accesses the selection register 304 to identify that no bits are selected from the EDID field 404, that five bits are selected from the DID field 406, that no bits are selected from the ESID field 408, that three bits are selected from the SID field 410, that nine bits are selected from the payload field 412, and that no bits are selected from the port field 414.

One of ordinary skill in the art would recognize that not all messages received at the destination processor 102 will include a header 134 with each of the fields listed above, or that a message 132 could include a header 134 with additional fields. In another embodiment, each of the selection registers 304 can include more or less fields. The message manager 114 then accesses the classification rule wildcard register 306 associated with the selected classification rule 312 to determine a number of consecutive bits in each of the fields of the header 134 and in the payload 136 to be masked during the identification of a queue for the message 132. Masked bits used herein are bits that are disregarded and not used during the selection/identification of a particular queue in a group of queues 120 for the message 132. The masking of bits in the fields of the header 134 enables a specific classification rule to be selected for a range of streams or messages, e.g., more than one stream or message, based on a particular number of the bits identified in the selection register 304 not being used for the queue identifier. In one embodiment, unmasked bits should be consecutive and the selection of bits by the message manager should start with the rightmost bit of the unmasked bits. The unmasked bits should be consecutive because non-consecutive unmask bits may result in an undefined behavior in the message manager 114.

The message manager 114 also accesses the classification rule wildcard register 306 associated with the selected classification rule 312 to identify the masked bits in the fields of the header 134 and the payload 136. For example, the message manager 114 accesses the classification rule wildcard register 306 associated with the selected classification rule 312 to identify two bits in the DID field 416 as masked bits. In an embodiment, the classification rule wildcard register 304 indicates which bits in a field are masked by setting those bits in the field to specific value, such as a digital '0' or '1'. The message manager 114 also accesses the classification rule wildcard register 304 to identify four bits in the SID field 418 as masked bits, and eight bits in the payload field 420 as masked bits. The message manager 114 then retrieves the particular bits 212 from the DID field 204, the particular bits 216 from the SID field 208, and the particular bits 218 from the payload 136 identified by the combination of the selection register 304 and the classification rule wildcard register 306. For example, the message manager 114 identifies the masked and unmasked bits within in the DID field 204 of the message 132, and then selects the particular bits 212 from the DID field 204 starting with the rightmost bit of the unmasked bits identified in the classification rule wildcard register 306. In this example, the message manager 114 selects the five bits in the DID field 204, identified as 212 in FIG. 4, based on the selection register 304 identifying that five bits are to selected and based on the classification rule wildcard register 306 identifying five consecutive unmasked bits in the DID field 416 of the classification rule wildcard register 306.

The message manager 114 then identifies the number of bits to retrieve from the SID field 208 based on the selection register 304, and identifies the unmasked bits within in the SID field 208 of the message 132 based on the classification rule wildcard register 306. The message manager 114 selects the particular bits 216 from the SID field 208 starting with the rightmost bit of the unmasked bits. For example, the message manager 114 selects the three bits in the SID field 208 of the message 132, identified as 216 in FIG. 4, based on the SID field 410 of the selection register 304 identifying that three bits are to be selected and that the SID field 416 of the classification rule wildcard register 306 identifying four consecutive unmasked bits. When selecting the specific bits 216, the message manager 114 selects minimum number of bits between the number of bits identified in the SID field 410 of the selection register 304 and the number of unmasked bits identified in the SID field 418 of the classification rule wildcard register 306. Thus, the message manager 114 selects only three bits as identified in the SID field 410 of the selection register 304 even though the SID field 418 of the classification rule wildcard register 306 identifies four unmasked bits. In an embodiment, the number of unmasked bits identified in the classification rule wildcard register 306 may be less than the number of bits identified in the selection register 304 for a given field. This situation may occur in response to a large number of bits being used for another purpose other than classification, and these bits should be masked during classification of the message 132 so that varying these bits does not effect the selection of a queue in the base group of queues 120, e.g. the most significant bits or the least significant bits can be masked during the classification of the message 132.

The message manager 114 identifies the number of bits to retrieve from the payload 136 based on the selection register 304, and identifies the unmasked bits within in the payload 136 of the message 132 based on the classification rule wildcard register 306 associated with the selected classification rule 312. The message manager 114 accesses the classification rule mode register 310 associated with the selected classification rule 312 to determine which bits of the payload 136 of the message 132 are used for generating queue offset 422 associated with the message 132. The message manager 114 selects the particular bits 218 from the payload 136 starting with the rightmost bit of the unmasked bits. In this example, the message manager 114 selects eight bits in the payload 136 of the message 132, identified as 218 in FIG. 4, based on the payload field 420 of the classification rule wildcard register 306 identifying eight consecutive unmasked bits and based on the payload field 412 of the selection register 304 identifying the nine bits to be selected. When selecting the specific bits 136, the message manager 114 selects a minimum number of bits between the number of bits identified in the SID field 410 of the selection register 304 and the number of unmasked bits in the SID field 418 of the classification rule wildcard register 306 since in this example the ninth bit is masked to the message manager 114 during classification of the message. Thus, the message manager 114 compresses the zero in the ninth bit to retrieve only the eight bits identified in the payload field 420 of the classification rule wildcard register 306.

The message manager 114 assembles the particular bits 212 from the DID field 204, the particular bits 216 from the SID field 208, and the particular bits 218 from the payload 136 of the message 132 into the queue offset 422. The message manager 114 then combines the queue offset 422 with the base queue identifier of the classification rule base queue register 308 associated with the selected classification rule 312 to create the queue identifier 402. Thus, the message manager 114 generates the queue identifier 402 to utilize deterministic virtual queuing of the message 132 when the I/O interface 112 receives the message 132, such that the message manager 114 does not utilize hashing to queue the message 132. In an embodiment, the queue identifier 402 can be limited to a specific number of bits, such as twenty four bits. Thus, the message manager 114 truncates bits of the queue identifier 402 if the combination of the queue offset 422 and the base queue identifier exceeds the specific number of bits for the queue identifier 402. The message manager 114 then sends the queue identifier 402 along with the message 132 to the queue manager 116, which in turn places the message 132 into the queue in the base group of queues 120 associated with the queue identifier 402.

Figure 5:
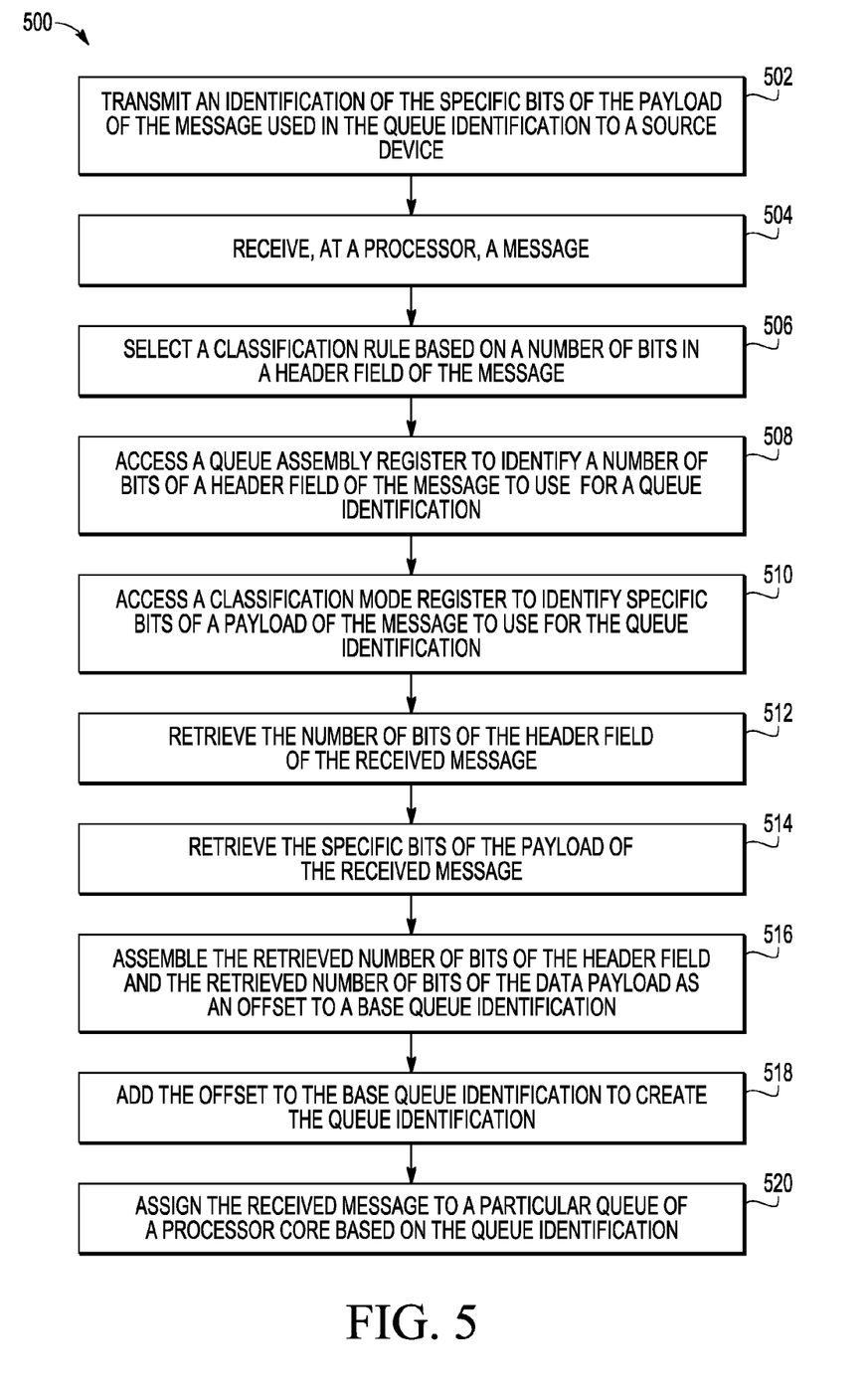
FIG. 5 illustrates a method for assigning a message to a queue in the processor of FIG. 1 in accordance with at least one embodiment of the present disclosure.

FIG. 5 illustrates a method for assigning a message to a queue in the processor of FIG. 1 in accordance with at least one embodiment of the present disclosure. At block 502, the destination processor 102 transmits an identification of the specific bits of the payload 136 of the message 132 used in the queue identifier 402 to a source device, such as processor 104 of FIG. 1, during a session protocol between the source device and the destination device. The session protocol can be utilized by the source and destination devices to configure each of the devices to transmit message between each other. At block 504, the destination processor 102 receives a message 132 at the I/O interface 112. At block 506, the message manager 114 selects a classification rule associated with particular bits in a field of a header 134 of the received message 132. The classification rule is selected based on a comparison between unmasked bits in the field of a header 134 of the message 132 for a particular classification rule 312 and the classification rule 312.

At block 508, the message manager 114 accesses the selection register 304 associated with the selected classification rule 312 to identify a number of bits of the header 134 of the message 132 to be used for the queue identifier 402. The message manager 114 accesses the classification rule mode register 306 associated with the selected classification rule 312 to identify specific bits in the payload 136 of the message 132 to be used for the queue identifier 402 at block 510. In an embodiment, the specific bits are a byte of the payload 136, such as the most significant byte, the least significant byte, or the like. The message manager 114 retrieves the number of bits from the field of the header 134 at block 512. The message manager 114 can retrieve the number of bits starting with a rightmost bit of unmasked bits in the field. The unmasked bits can be identified by the classification rule wildcard register 306 associated with the selected classification rule 312.

At block 514, the message manager 114 retrieves the specific bits of the payload 136 of the message 132. The retrieved bits from the header field and the retrieved bits from the payload 136 can be the minimum number of bits identified in either the selection register 304 or the classification rule wildcard register 306. The message manager 114 assembles the retrieved bits from the header field and the retrieved bits from the payload 136 to create an offset to a base queue identifier at block 516. At block 518, the message manager 114 adds the offset to the base queue identifier to create the queue identifier 402. In an embodiment, if the number of bits in the offset and the base queue identifier exceed the maximum number of bits for the queue identifier, the message manager 114 can truncate one or more of the bits. The queue manager 116 assigns the message 132 to a particular queue of a base group of queues 120 based on the queue identifier 402 at block 520.

In accordance with one aspect of the present disclosure, a method of communicating information between a plurality of processors is provided. In one embodiment, the method includes receiving, from a processor of the plurality of processors, a message in a stream. The method further includes identifying a classification rule for the message based on bits in a header of the message. The method also includes generating a queue offset based bits in a payload of the message. The method further includes assigning the message to a queue of a processor core in the processor based on the classification rule and the queue offset.

In one embodiment, the method includes retrieving bits from the header of the message. The method also includes retrieving bits from the payload of the message. The method further includes creating a queue identifier for the message using the retrieved bits of the header, and the retrieved bits of the payload. In this case, the method further includes assembling the retrieved bits of the header and the retrieved bits of the payload as the queue offset for the queue identifier. The method also includes adding the queue offset to a base queue identifier of the message to create the queue identifier.

In one embodiment, the method further includes truncating one or more bits of the queue offset in response to a total number of bits from the queue offset and the base queue identifier exceeding a maximum number of bits for the queue identifier. In one embodiment, the method further includes identifying bits in the header and specific bits of the payload of the message to use for a queue identifier based on bits in a register. The method also includes transmitting information identifying the specific bits of the payload of the message used in the queue identifier to the processor of the plurality of processors that is to provide the message prior to receiving the message.

In accordance with another aspect of the present disclosure, a method of communicating information between a plurality of processors is provided. In one embodiment, the method includes receiving, at a first processor, a message in a stream from a second processor. The method further includes creating an offset based on bits in a header and bits in a payload of the message. The method also includes identifying a classification rule for the message based on the bits in the header of the message. The method further includes combining the offset to a base queue identifier of the message to create a queue identifier, wherein the base queue identifier is based upon the classification rule. The method also includes assigning the message to a queue of a processor core in the processor based on the queue identifier.

In one embodiment, the method further includes identifying the bits of in the header and specific bits of the payload of the message to use for the queue identifier based on bits in a register of the first processor. The method further includes transmitting information identifying the specific bits of the payload of the message used to create the offset to the second processor prior to receiving the message. In one embodiment, the method includes retrieving, prior to creating the queue identifier, the bits of the message to be used in the queue identifier. The method also includes retrieving, prior to creating the queue identifier, the bits of the payload of the message to be used in the queue identifier.

In one embodiment, the method includes that identifying the bits in the header further includes: identifying masked bits in the header of the message to select specific bits to retrieve the bits of the header. In this case, identifying the bits of the payload further includes: identifying masked bits of the payload of the message to select specific bits to retrieve the bits of the payload. In one embodiment, truncating one or more bits of the offset in response to a total number of bits from the offset and the base queue identifier exceeding a maximum number of bits for the queue identifier. The method also includes that the classification rule is identified only based on bits in the header of the message. The method also includes that the queue identifier is created based on the bits in the header and the bits in the payload of the message.

In accordance with another aspect of the present disclosure, a processor of a plurality of processors of an integrated circuit device is provided. The processor includes a processor core, and a message manager. In one embodiment, the message manager is in communication with the processor core, and the message manager receives a message from a second processor of the plurality of processors, identifies a classification rule for the message based on bits in a header of the message, and creates a queue identifier for the message using bits of a payload of the message. In this case, the queue identifier is associated with a queue of the processor core. In one embodiment, the message manager includes: a first register to store a value to identify bits to retrieve from the header of the message for the queue identifier, a second register to store a value to identify bits of the payload of the message to retrieve for the queue identifier, and a third register to store masked bits for the header and masked bits for the payload. In this case, the message manager utilizes unmasked bits for the header to identify bits of the header to retrieve, and utilizes unmasked bits for the payload to identify the bits of the payload to retrieve.

In one embodiment, the processor further includes a queue manager in communication with the message manager. In this case, the queue manager receives the queue identifier associated with the message, and assigns the message to the queue based on the queue identifier. In one embodiment, the message manager further retrieves, prior the queue identifier being created, bits of the header of the message to be used in the queue identifier, and retrieves, prior the queue identifier being created, the bits of the payload of the message to be used in the queue identifier. In one embodiment, the processor further includes a register to provide a base queue identifier, the message manager to assemble the retrieved bits of the header and the retrieved bits of the payload as an offset to a base queue identifier to create a queue identifier. In one embodiment, the message manager creates an offset to a base queue identifier, and the offset includes the bits of the payload.

In different embodiments, the message manager 114 and the base queue identification module 302 can includes hardware circuitry, software, state machines, executable code, and the like. Based upon the description herein, it will be appreciated that the preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method of communicating information between a plurality of processors, the method comprising:
   receiving, from a processor of the plurality of processors, a message in a stream;
   identifying a classification rule for the message based on bits in a header of the message;
   generating a queue offset based bits in a payload of the message; and
   assigning the message to a queue of a processor core in the processor based on the classification rule and the queue offset.

2. The method of claim 1, further comprising:
   retrieving bits from the header of the message;
   retrieving bits from the payload of the message; and
   creating a queue identifier for the message using the retrieved bits of the header, and the retrieved number of bits of the payload.

3. The method of claim 2, further comprising:
   assembling the retrieved bits of the header and the retrieved bits of the payload as the queue offset for the queue identifier; and
   adding the queue offset to a base queue identifier of the message to create the queue identifier.

4. The method of claim 3, further comprising:
   truncating one or more bits of the queue offset in response to a total number of bits from the queue offset and the base queue identifier exceeding a maximum number of bits for the queue identifier.

5. The method of claim 1, further comprising:
   identifying bits in the header and specific bits of the payload of the message to use for a queue identifier based on bits in a register.

6. The method of claim 5, further comprising:
   transmitting information identifying the specific bits of the payload of the message used in the queue identifier to the processor of the plurality of processors that is to provide the message prior to receiving the message.

7. A method of communicating information between a plurality of processors, the method comprising:
   receiving, at a first processor, a message in a stream from a second processor;
   creating an offset based on bits in a header and bits in a payload of the message;
   identifying a classification rule for the message based on bits in the header of the message;
   combining the offset to a base queue identifier of the message to create a queue identifier, wherein the base queue identifier is based upon the classification rule; and
   assigning the message to a queue of a processor core in the processor based on the queue identifier.

8. The method of claim 7, further comprising:
   identifying the bits of in the header and specific bits of the payload of the message to use for the queue identifier based on bits in a register of the first processor.

9. The method of claim 8, further comprising:
   transmitting information identifying the specific bits of the payload of the message used to create the offset to the second processor prior to receiving the message.

10. The method of claim 8, wherein creating the offset for the message further comprises:
    retrieving, prior to creating the queue identifier, the bits of the message to be used in the queue identifier; and
    retrieving, prior to creating the queue identifier, the bits of the payload of the message to be used in the queue identifier.

11. The method of claim 10, wherein identifying the bits in the header further comprises: identifying masked bits in the header of the message to select specific bits to retrieve the bits of the header, and wherein identifying the bits of the payload further comprises: identifying masked bits of the payload of the message to select specific bits to retrieve the bits of the payload.

12. The method of claim 10, further comprising:
    truncating one or more bits of the offset in response to a total number of bits from the offset and the base queue identifier exceeding a maximum number of bits for the queue identifier.

13. The method of claim 7, wherein the classification rule is identified only based on bits in the header of the message.

14. The method of claim 7, wherein the queue identifier is created based on the bits in the header and the bits in the payload of the message.

15. A processor of a plurality of processors of an integrated circuit device, the processor comprising:
    a processor core; and
    a message manager in communication with the processor core, the message manager to receive a message from a second processor of the plurality of processors, to identify a classification rule for the message based on bits in a header of the message, and to create a queue identifier for the message using bits of a payload of the message, wherein the queue identifier is associated with a queue of the processor core.

16. The processor of claim 15, wherein the message manager includes:
    a first register, the first register to store a value to identify bits to retrieve from the header of the message for the queue identifier;
    a second register, the second register to store a value to identify bits of the payload of the message to retrieve for the queue identifier; and
    a third register, the third register to store masked bits for the header and masked bits for the payload, the message manager to utilize unmasked bits for the header to identify bits of the header to retrieve, and to utilize unmasked bits for the payload to identify the bits of the payload to retrieve.

17. The processor of claim 15, further comprising:
    a queue manager in communication with the message manager, the queue manager to receive the queue identifier associated with the message, and to assign the message to the queue based on the queue identifier.

18. The processor of claim 15, the message manager further to retrieve, prior the queue identifier being created, bits of the header of the message to be used in the queue identifier, and to retrieve, prior the queue identifier being created, the bits of the payload of the message to be used in the queue identifier.

19. The processor of claim 18, further comprising:
a register, the register to provide a base queue identifier, the message manager to assemble the retrieved bits of the header and the retrieved bits of the payload as an offset to a base queue identifier to create a queue identifier.

20. The processor of claim 15, wherein the message manager to create an offset to a base queue identifier, wherein the offset includes the bits of the payload.

* * * * *